(12) United States Patent
Raffeiner

(10) Patent No.: US 6,524,105 B2
(45) Date of Patent: Feb. 25, 2003

(54) DENTAL MODEL

(75) Inventor: Oscar Raffeiner, Franz Innerhoferstrasse (IT)

(73) Assignee: Ivoclar Vivadent AG, Schaan (LI)

( * ) Notice: Subject to any disclaimer, the term of this patent is extended or adjusted under 35 U.S.C. 154(b) by 0 days.

(21) Appl. No.: 09/834,225

(22) Filed: Apr. 12, 2001

(65) Prior Publication Data

US 2001/0044092 A1 Nov. 22, 2001

Related U.S. Application Data

(60) Provisional application No. 60/215,922, filed on Jul. 3, 2000.

(30) Foreign Application Priority Data

May 16, 2000 (DE) .......................................... 100 23 842

(51) Int. Cl.[7] .......................... A61C 11/00; G09B 23/28
(52) U.S. Cl. ....................................... 433/213; 434/263
(58) Field of Search ............................. 433/34, 60, 74, 433/213; 434/263, 264

(56) References Cited

U.S. PATENT DOCUMENTS 1,045,920 A * 12/1912 Wenker
2,005,114 A * 6/1935 Spitzer et al.
2,750,670 A * 6/1956 Vigg
3,458,936 A * 8/1969 Schulz et al.
3,886,661 A  6/1975 Neill
4,267,097 A  5/1981 Michl et al.
5,120,229 A * 6/1992 Moore et al. ................ 434/263
5,129,822 A * 7/1992 Dobbs .......................... 433/34
5,738,518 A * 4/1998 Nowak ........................ 433/74

FOREIGN PATENT DOCUMENTS

CA        2051333        3/1992

* cited by examiner

Primary Examiner—Cary E. O'Connor
(74) Attorney, Agent, or Firm—John C. Thompson; Alan S. Korman

(57) ABSTRACT

A dental model, in particular for practice purposes, is provided, and has a support plate with recesses for artificial teeth, each of which has a tooth stump that fits into the associated recess. A gum mass overlaps both the teeth of a row of teeth and the recesses. The teeth are each disengageably held on the plate and in their associated recess with friction.

14 Claims, 3 Drawing Sheets

DENTAL MODEL

CROSS-REFERENCE TO RELATED APPLICATIONS

This application claims foreign priority benefits under 35 U.S.C. §119(a)–(d) from German patent application Ser. No. P 100 23 842.4 filed May 16, 2000. In addition, this application claims the benefit under 35 U.S.C. §119(e) of U.S. provisional patent application ser. no. 60/215,922 filed Jul. 3, 2000.

BACKGROUND OF THE INVENTION

The invention relates to a dental model that includes a support plate having recesses for receiving the stumps of artificial teeth, and that is suitable in particular for practicing and for demonstration purposes, preferably for preparing carious locations and providing the cavity with filling materials. Furthermore, all work that a dentist performs on a patient can be performed on the dental model.

Such a practice dental model is known, e.g. from U.S. Pat. No. 3,886,661. In this solution, a practice set of teeth can be inserted into a plate. The design of a natural jaw is constructed using various elements. One advantage of this solution compared to other known solutions in which the teeth can only be exchanged all at one time is that, depending on the practical exercise, the tooth to be worked on can be exchanged so that running costs are lower. On the other hand, however, special teeth must be produced and maintained as replacements for this model, so that it is necessary to maintain a special inventory.

Furthermore, it has already been suggested that a dental model be realized that combines a hard guide material with an elastic material for the bearing or support material. This is meant to simulate the bearing stiffness of the natural jawbone, whereby the employment of silicone rubber is meant to ensure that individual teeth can be removed but will not fall out inadvertently. However, in these solutions the guide and mounting of the tooth itself is elastic. The tooth thus moves laterally when pressure is exerted so that such a tooth is suitable, e.g., for model work. However, fairly strong lateral pressure must be exerted, e.g. during drilling, so that such elastically-borne models of the jaw are not suitable.

Another problem with this type of dental model is the disengageable bearing of the teeth. When the tooth is borne elastically gripping in the associated root recess, drilling dust that falls into the recess gradually exercises a negative effect on the gripping properties so that the recess must either be cleaned regularly, which is a time-consuming process, or the model has to be exchanged after short periods of time.

In dental models which bear the teeth fixed, a special coupling must be realized in order to provide a fixed support to the tooth, but one that can be disengaged. Even in the combined bearings already suggested that are made partially from fixed recess regions and partially from elastic recess regions, drill dust can penetrate into the gap in the region of the fixed bearing.

OBJECTS AND SUMMARY OF THE INVENTION

The object of the invention is to create a dental model of the aforementioned general type that is improved with regard to the simple and reliable exchangeability of individual teeth, secureness of bearing, and stability of the teeth under load. The dental model should be able to be employed numerous times and should be consistent with a patient case in shape and material.

This object is realized by the dental model of the present invention, which is characterized primarily by a tooth gum mass that overlaps both the teeth as well as the recesses, wherein the teeth are releasably held, with friction, on the support plate and in the respective recesses.

In accordance with a particularly advantageous aspect of the present invention, using the mounting in accordance with the invention the tooth can be secured and supported in the plate. In addition, the bearing of the tooth in the recess in question is also sealed automatically in the plate so that no drilling dust can penetrate into this critical region. The crown tooth can thus be fixed permanently and in a stable manner in the plate comprising stiff material, even against lateral forces that are introduced, e.g. by a dental drill. In addition, the gum mass partially surrounds the tooth so that the jaw of a patient is simulated. When one tooth is exchanged for another, the support of the tooth by the tooth stump and by friction elements causes the tooth to assume exactly the same position.

It is also particularly advantageous that the appearance of the dental model approximates nature, whereby the gum mass can be colored to approximate natural gums. The holding force of the gum mass can be widely adapted to requirements. For instance, an undercut can be provided that works against an undercut in the tooth and forms a disengageable lock. The gum mass can also have undercuts that work against undercuts in the plate. Preferably both the plate and the teeth each have a projecting lug or peg and the gum mass has corresponding recesses. It is particularly advantageous in this regard if the plastic alveolar crest that forms the recesses for the teeth also has rough surfaces on its lateral sides. This ensures that there is a certain positive fit between plate and gum mass that promotes the gum gripping the plate.

It is understood that the pre-stress of the gum mass when held on the alveolar crest or with regard to the teeth in broad areas can be adapted to the requirements. The gum mass can comprise, e.g., pink silicone that is somewhat transparent so that the course of the tooth is visible to the attending dentist using the dental model for practice, at least in the region of the anterior teeth.

In accordance with the invention it is particularly advantageous that teeth mass-produced can be used for the dental model in accordance with the invention. The teeth in accordance with the invention can be constructed in a plurality of layers in a manner known per se and provided with a tooth stump made of inexpensive plastic. Preferably, however, the teeth are made of one material. The tooth stump fits into the associated recess in the alveolar crest of the plate, whereby the tooth is already securely borne due to the conical embodiment of both the recess and the tooth stump.

Preferably immediately adjacent to the area of the tooth stump surrounded by the recess the tooth has a peg or projection that extends laterally and forms an undercut. The peg or projection engages in a recess in the model, fitting rather precisely, so that the tooth is also held in to place by this frictional element. The gum mass has at a plurality of locations undercuts that work against the plate so that they grip the teeth and model securely.

The model in accordance with the invention can be used for a model of the upper jaw or lower jaw. In addition, it is easy to disengage the tooth in the guide from the friction and in the recess so that after a practical session the tooth can be exchanged with no further action required. In accordance with the invention it is also particularly advantageous that the base plate can be mass-produced from an inexpensive plastic. In addition, the plate can also be used in an articulator so that it is possible to simulate chewing and, e.g., it is possible to check the occlusion when bridges are being prepared. One or two teeth can simply be removed from the model so that the result is a working model for preparing a bridge.

In accordance with one advantageous aspect of the invention, identical shapes are provided for the recess and the associated tooth stump for identical or corresponding teeth. Thus it is possible to reduce the different tooth shapes to be maintained for a dental model, whereby there is still nonetheless distinct or noninterchangeable insertability.

BRIEF DESCRIPTION OF THE DRAWINGS

Additional details, advantages, and features result from the following description of an exemplary embodiment with respect to the drawings.

DETAILED DESCRIPTION

Figure 1:
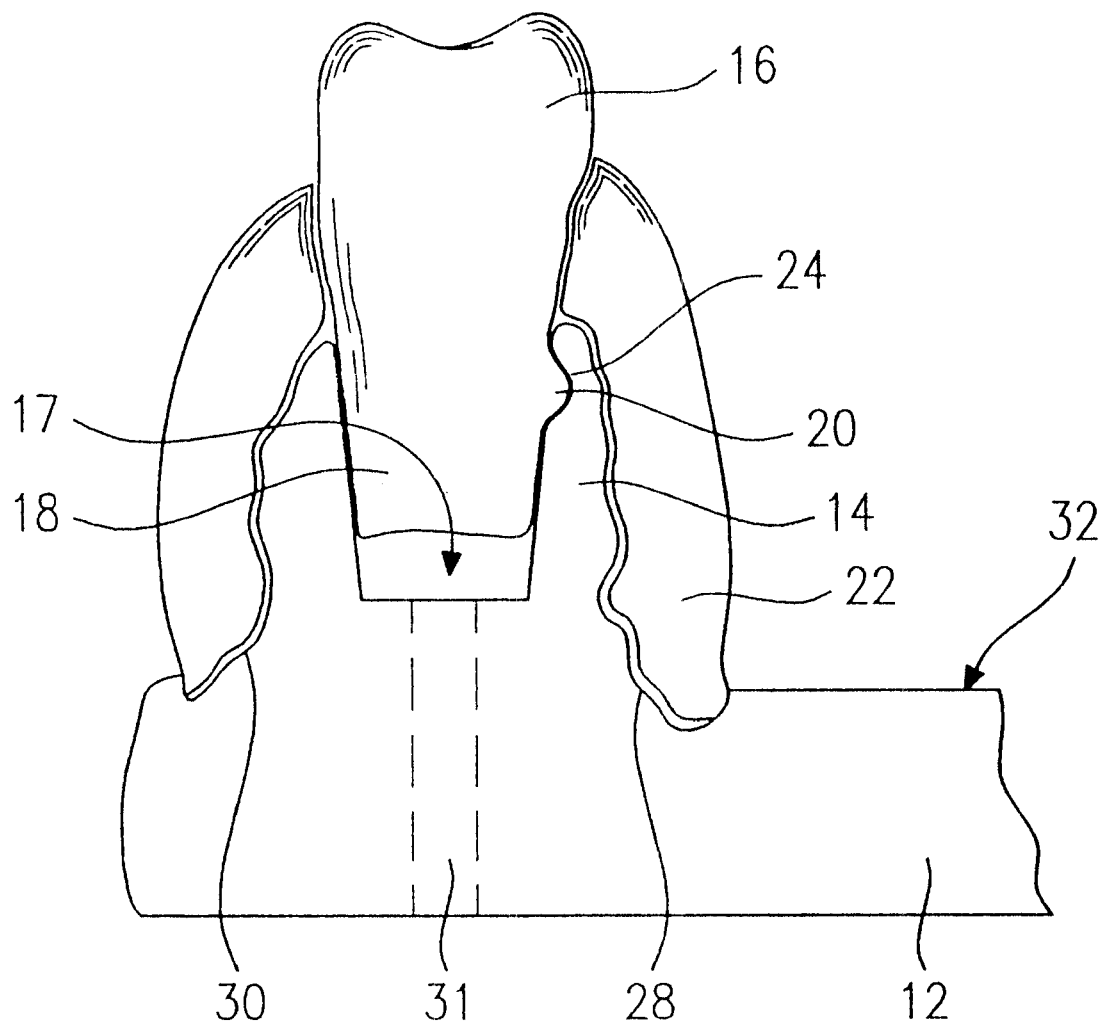
FIG. 1 is a schematic sectional view along the line I—I in FIG. 3, illustrating a detail of a dental plate in accordance with the invention.
Figure 3:
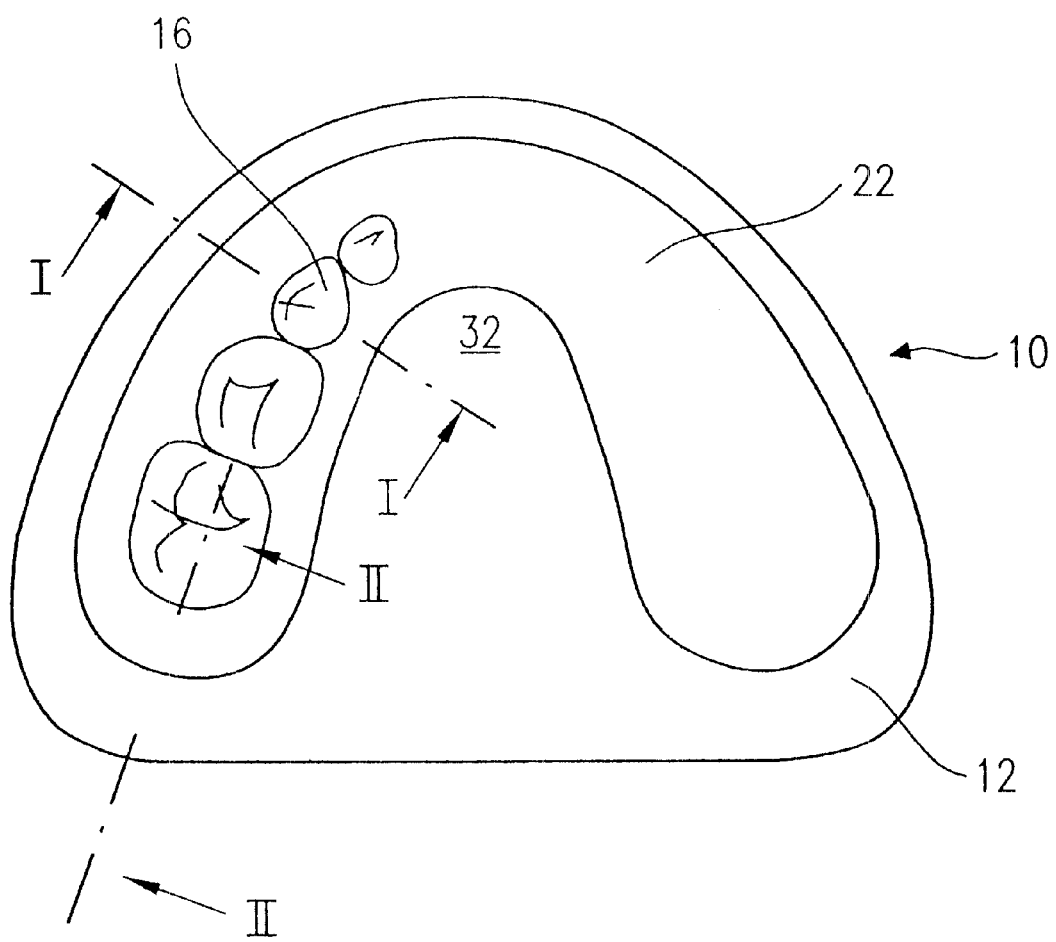
FIG. 3 is a top-view of a dental plate of one embodiment of the invention.

The dental model 10 shown in a top-view in FIG. 3 is illustrated in substantial detail in a sectional view in FIG. 1. The dental model has a plate 12 that is integrally constructed and that carries an alveolar crest 14 that has a plurality of recesses that are embodied suitably for receiving teeth 16.

FIG. 1 illustrates a tooth. A recess 17 has inclined, upwardly diverging sides. Fitting therewith, the tooth 16 has a tooth stump 18 that is embodied conically. The tooth stump 18 and the recess 17 are not circular; rather, they are preferably oval, and the fit is selected such that a certain free space remains between the tooth stump 18 and the bottom of the recess 17.

Due to the slight cone angle, the tooth 16 is already fixed fairly well in the recess 17.

Extending laterally away immediately adjacent to the tooth stump 18 is a lug or peg 20 that precisely supports the tooth 16 as described below. The peg 20 rests against on the alveolar crest 14, whereby the clamping effect between tooth stump 18 and recess 17 is not negatively affected. The cone angle of the tooth stump 18 is preferably between 2° and 20°, preferably between 5° and 12°, and especially about 8°. Such an embodiment ensures disengageable clamping.

Provided surrounding the alveolar crest and intensively covering it and also a part of the teeth 16 is an elastic mass for the gum mass 22; it ensures a connection between the plate 12 and the teeth 16. The gum mass 22 is made of gum-colored dyed silicone and surrounds the teeth in a manner that is like the manner in which natural gums surround teeth. The alveolar crest 14 has a recess 24 into which the peg 20 fits precisely. The peg 20 thus forms an undercut against a lateral surface in the recess 24, the elastic resistance of which is overcome when the tooth 16 is pulled therefrom.

In accordance with the invention it is particularly advantageous that the recess 24 in the upper region of the alveolar crest 14 is held by the cam-shaped peg 20. At that point the alveolar crest is still relatively elastic so that it is possible to pull the tooth out. The bearing between recess 24 and peg 20 supports the frictional bearing of the tooth stump 18 in the recess 17.

Preferably the gum mass 22 rests against the teeth 16 with a slight pre-stress. This means that drilling material that falls cannot penetrate into the bearing gap.

Furthermore, the gum mass has structured surfaces 28 and 30 that face the alveolar crest 14. These surfaces are a negative image of the associated surfaces of the alveolar crest 14, thus stabilizing and improving the bearing between plate 12 and gum mass 22.

In the exemplary embodiment illustrated in FIG. 1 a bore or through-hole 31 is provided such that it passes through the plate 12. It extends approximately in the center between the underside of the plate 12 and the recess 17. If necessary, the tooth 16 can be pressed out via this bore 31 using a suitable article, e.g. a thick nail. Despite the very secure and drill-stable bearing or support of the tooth on the plate 12, this solution permits the tooth to be exchanged as needed.

Furthermore it is provided that the gum mass 22 ends somewhat below the upper side 32 of the plate. The plate 12 has fitting edge connection depressions and the gum mass 22 extends correspondingly, as can be seen in FIG. 1. This embodiment improves support while reducing the tendency to become soiled.

Figure 2:
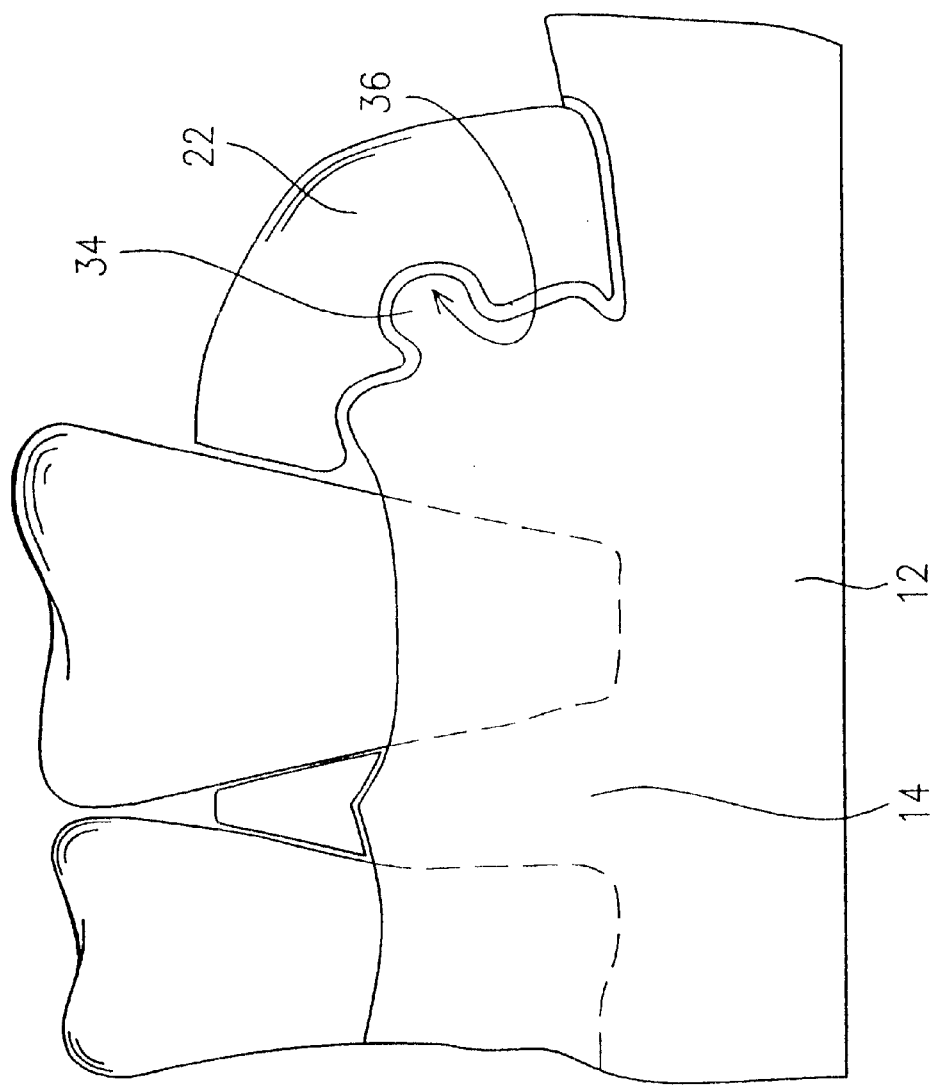
FIG. 2 is a schematic sectional view along the line II—II in FIG. 3, illustrating a detail of a dental plate in accordance with the invention.

FIG. 2 shows that the plate 12 is also connected to the gum mass by additional back tapers or undercuts. In this regard, provided on the rearward end of the alveolar crest 14 is a lug or peg 34 that penetrates into an associated recess 36 in the gum mass 22. A plurality of corresponding connections are also provided distributed across the alveolar crest so that overall the gum mass 22 is well secured to the plate 12 but is also borne so that it can disengage due to its elasticity.

As can be seen from FIG. 3, the gum mass 22 is essentially U-shaped and extends across the plate 12 following the alveolar crest. The teeth 16 are arranged in a row that coincides with the arrangement of real teeth. The material for the profiled holder 12 is a fairly stiff yet inexpensive plastic material, e.g. an epoxy resin. Based on the slender embodiment of the alveolar crest 14, however, there is a certain elasticity so that the attending dentist will find the same mechanical conditions that he will encounter later in the mouth of a patient.

The teeth 16 are produced from two or more layers. Preferably they have a cutting and dentine layer, whereby the tooth stump 18 is an additional layer. The hardness of the cutting and dentine layer and of the neck of the tooth is essentially comparable to that of a natural tooth so that the practicing student will find the same qualities in the dental model that he would find in the natural teeth of a patient.

The teeth 16 are made of a composite material and are industrially pre-fabricated. Such materials are described, e.g. in U.S. Pat. No. 4,267,097 (equivalent to DE 24 03 211 C2) or in CA 2,051,333 (equivalent to DE 40 29 230 C2), the disclosures of which are hereby incorporated into this application by this reference thereto.

While a preferred form of this invention has been described above and shown in the accompanying drawings, it should be understood that applicant does not intend to be limited to the particular details described above and illustrated in the accompanying drawings, but intends to be limited only to the scope of the invention as defined by the following claims.

What is claimed is:

1. A dental model comprising:

a support plate having recesses for receiving artificial teeth in a row, each of said teeth having a tooth stump that fits into an associated one of said recesses; and a gum mass that overlaps both said teeth as well as said recesses, wherein said teeth are releasably held, with friction, on said support plate and in said respective recesses, and wherein said support plate has distributed thereon a plurality of undercuts for supporting said gum mass and for fitting undercuts of said gum mass.

2. A dental model according to claim 1, wherein surfaces that are to be joined together are produced by impressions of one another.

3. A dental model according to claim 1, wherein surfaces of said gum mass and said support plate that face one another, especially in the region of said alveolar crest, have slight rises and depressions that mimic natural gums and that improve the grip.

4. The dental model as set forth in claim 1 wherein the tooth stumps and recesses have cooperating laterally extending form fitting means for positioning and holding the teeth in the recesses.

5. The dental model according to claim 4, wherein the form fitting means are pegs and recesses which are provided with an undercut that each work against each other.

6. The dental model according to claim 4, wherein the material for the support plate is a fairly stiff plastic material, wherein the raised portion is fairly slender, so that there is a certain elasticity so that the attending dentist will find the same mechanical conditions that he will encounter later in the mouth of a patient.

7. The dental model as set forth in claim 1 wherein the recesses are in a raised portion of the support plate resembling an alveolar crest.

8. The dental model according to claim 7, wherein said teeth are held in an elastically clamping manner on the alveolar crest of said support plate that receives said recesses thereof.

9. The dental model according to claim 8, wherein said teeth are produced from two or more layers, preferably having a cutting and dentine layer, and wherein the tooth stump is an additional layer, the hardness of the cutting and dentine layer and of the neck of the tooth being essentially comparable to that of a natural tooth so that a practicing student will find the same qualities in the dental model that he would find in the natural teeth of a patient.

10. The dental model according to claim 1 wherein said teeth are supported in said recesses in a manner essentially free of play.

11. The dental model according to claim 1 wherein said recesses, when viewed downwardly from the side of the gum mass, are provided with inclined upwardly diverging sides, and wherein each corresponding tooth stump fits said sides.

12. The dental model according to claim 11 wherein each tooth stump is cut off and extends into said support plate somewhat above a base of a respective recesses.

13. The dental model according to claim 11, wherein the cone angle of said tooth stump is preferably between 5° and 12° to ensure disengageable clamping.

14. The dental model according to claim 1, wherein said gum mass has rises and depressions on its external surface that mimic natural gums.

* * * * *